(12) United States Patent
Christenson et al.

(10) Patent No.: US 12,057,782 B2
(45) Date of Patent: Aug. 6, 2024

(54) SMART TRANSFORMER DEVICE

(71) Applicant: Sisu Devices LLC, Round Rock, TX (US)

(72) Inventors: Marc Christenson, Round Rock, TX (US); Austin Christensen, Round Rock, TX (US); Mark Frye, Round Rock, TX (US); Jason Dearden, Round Rock, TX (US); Mathius Jules, Round Rock, TX (US); Savan Patel, Round Rock, TX (US)

(73) Assignee: Sisu Devices LLC, Round Rock, TX (US)

( * ) Notice: Subject to any disclaimer, the term of this patent is extended or adjusted under 35 U.S.C. 154(b) by 163 days.

(21) Appl. No.: 17/826,001

(22) Filed: May 26, 2022

(65) Prior Publication Data

US 2022/0385201 A1 Dec. 1, 2022

Related U.S. Application Data

(60) Provisional application No. 63/193,527, filed on May 26, 2021.

(51) Int. Cl.
*H02M 5/14* (2006.01)
(52) U.S. Cl.
CPC .................... *H02M 5/14* (2013.01)
(58) Field of Classification Search
CPC .... H02M 5/14; G05F 1/12; G05F 1/13; H02J 3/46
See application file for complete search history.

(56) References Cited

U.S. PATENT DOCUMENTS

| 6,275,405 | B1* | 8/2001 | Pernyeszi | H02M 5/14 |
| | | | | 363/150 |
| 9,083,235 | B2* | 7/2015 | Steinberg | H02M 5/14 |
| 2010/0237704 | A1* | 9/2010 | Nakajima | H02M 5/14 |
| | | | | 363/154 |
| 2015/0222194 | A1 | 8/2015 | Bundschuh | |
| 2015/0365003 | A1 | 12/2015 | Sadwick | |

(Continued)

FOREIGN PATENT DOCUMENTS

AU 2012101965 A4 10/2016
KR 101565554 B1 11/2015

OTHER PUBLICATIONS

Almeida et al., "Single-Phase to Three-Phase Ac-Dc-Ac Converter Based on Cascaded Transformers Rectifier and Open-End Winding Induction Motor", IEEE Xplore, dated Apr. 16, 2020, 6 pages.

*Primary Examiner* — Gary L Laxton
(74) *Attorney, Agent, or Firm* — Eversheds Sutherland (US) LLP

(57) ABSTRACT

This disclosure describes systems, methods, and devices related to a smart transformer devices. A device may receive a power input, wherein the power input includes a voltage input and a phase input. The device may then determine whether the phase input is single-phase or three-phase, wherein the power input is converted into three-phase responsive to a determination that the phase input is single-phase. The device may further determine whether the voltage input is between a first voltage and a second voltage. Responsive to a determination that the voltage input is between the first voltage and the second voltage, the device may route the power input through a plurality of transformer coils to produce a power output.

20 Claims, 6 Drawing Sheets

(56) References Cited

U.S. PATENT DOCUMENTS

2015/0365007 A1* 12/2015 Kaukojärvi .............. H02J 3/26
                                                        363/148
2017/0243692 A1*  8/2017 Limvorapun ........... H02M 5/14

* cited by examiner

400

SMART TRANSFORMER DEVICE

CROSS-REFERENCE TO RELATED PATENT APPLICATIONS

This application claims the benefit of U.S. Provisional Application No. 63/193,527, filed May 26, 2021, the disclosure of which is incorporated by reference as set forth in full.

TECHNICAL FIELD

This disclosure generally relates to systems, methods, and devices for power distribution technologies and, more particularly, for smart transformer devices.

BACKGROUND

Generally, transformer devices allow power distribution where a required power output is different from an available power input. Some transformer devices are thus capable of powering industrial three-phase 480 Volts Alternating Current (VAC) portable equipment, even though power outlets in the area may not be compatible with powering said industrial three-phase 480 VAC portable equipment.

DETAILED DESCRIPTION

Figure 1:
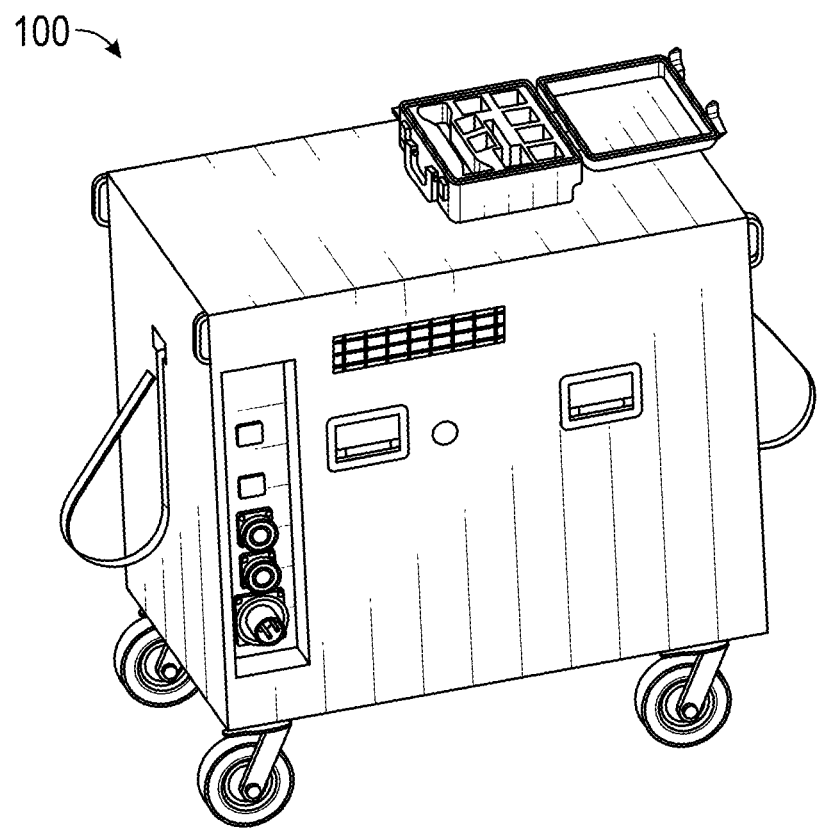
FIG. 1 is an illustrative diagram of a smart transformer system, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Systems may be configured to power industrial three-phase 480 Volts Alternating Current (VAC) portable equipment, for example, a cinema robot arm. However, in some locations, only single-phase voltages may exist. In other locations, only three-phase power at a lower voltage may be available. In yet other locations, only power outlets at a lower voltage may be conveniently accessible to an operator. In such instances, the operator may be limited in his or her ability to power such industrial three-phase 480 VAC portable equipment.

There are several present mechanisms for powering industrial three-phase 480 VAC portable equipment in such locations. One mechanism for powering industrial three-phase 480 VAC portable equipment in locations where three-phase power at a lower voltage is available is to hire an electrician to permanently install or create a temporary power distribution transformer setup rated for only one input voltage and phase configuration. However, this mechanism may not be preferable because it is expensive and requires an electrician to install, modify, and verify each setup at each location.

Another mechanism for powering industrial three-phase 480 VAC portable equipment in locations where only single-phase voltages are available, and in locations where three-phase voltages may be difficult to access, is to rent or buy an industrial three-phase 480V generator and connect the industrial three-phase 480 VAC portable equipment to the industrial three-phase 480V generator. However, this mechanism may not be preferable because many industrial three-phase 480V generators are loud and can be large. For example, some industrial three-phase 480V generators take the form of a generator trailer that is towed behind a truck. Further, this mechanism may not be preferable because industrial three-phase 480V generators may be inconvenient to use due to the size of the industrial three-phase 480V generators, which may require that they remain parked in an appropriate parking location during use. Thus, lengthy extension cords may be required in order to connect the industrial three-phase 480V generator to the industrial three-phase 480 VAC portable equipment.

Yet another mechanism for powering industrial three-phase 480 VAC portable equipment is for the operator to upgrade a building or location to enable three-phase 480V distribution. However, this mechanism may not be preferable because this process is lengthy and expensive. The process may also involve utility engineers, city planning officials, and other local governmental agencies.

It would thus be beneficial to replace the present mechanisms for powering industrial three-phase 480 VAC portable equipment with a mechanism that powers industrial three-phase 480 VAC portable equipment through convenient and safe methods, such as by utilizing a combination of sensors, microcontrollers, filters, breakers, and power converters in an easy-to-use and self-protecting package. It may further be beneficial for this easy-to-use and self-protecting package may further provide additional benefits such as filtering for an internal Direct Current (DC) power bus, sound dampening, and increased user safety.

Example embodiments of the present disclosure relate to systems, methods, and devices for a mechanism for smart transformers.

In one or more embodiments, a device may receive a power input. The power input may comprise a voltage input and a phase input. The device may determine whether the phase input is single-phase or three-phase. If the device determines that the phase input is single-phase, the power input may be converted into three-phase. The device may further determine whether the voltage input is between a first voltage and a second voltage. If the voltage input is determined to be between the first voltage and the second voltage, the power input may be routed through a plurality of transformer coils to produce a power output.

In one or more embodiments, the device may automatically determine whether the phase input is single-phase or three-phase. The device may additionally automatically determine that the voltage input is between the first voltage and the second voltage.

In one or more embodiments, if the voltage input is automatically determined to be not between the first voltage and the second voltage, the device may output a notification via a multi-colored LED indicator.

In one or more embodiments, the device may further determine whether a phase voltage, a phase unbalance, a phase loss, and a phase reversal are within a predetermined range.

In one or more embodiments, the device may further include a first contactor and a second contactor. In some embodiments, the second contactor is configured to remain open when the first contactor is closed.

In one or more embodiments, the first voltage may be a 208 VAC with a tolerance of +/−7%, and the second voltage may be a 240 VAC having a tolerance of +/−7%. In one or more embodiments, the power output may be a three-phase 480 VAC having a tolerance of +/−10%.

The proposed solution thus enables a mechanism to power industrial three-phase 480 VAC portable equipment through convenient and safe methods. Such a mechanism not only ensures the convenience of powering industrial three-phase 480 VAC portable equipment by utilizing a combination of sensors, microcontrollers, filters, breakers, and power converters in a portable, easy-to-use, and self-protecting package, but also further provides additional benefits such as increased user safety.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is an illustrative diagram of a smart transformer system, in accordance with one or more example embodiments of the present disclosure.

Referring to FIG. 1, there is shown a smart transformer 100. The smart transformer 100 may be a portable electrical transformer that is capable of providing consistent high-voltage three-phase 480 VAC power from a wide range of common single and three-phase lower voltage power inputs. The smart transformer 100 may further increase operator safety, as operators will no longer have to connect sensitive robotic equipment into unknown power outlet voltages, thus avoiding the risk of outputting an excessively high voltage due to a higher-than-anticipated input power.

In some embodiments, the smart transformer 100 may include additional output power capacity. For example, in some embodiments, the smart transformer 100 may be configured to provide up to 15 kVA (kilovolt-amperes) of power output. In other embodiments, the smart transformer 100 may be configured to provide more than 15 kVA of power output. In some embodiments, the smart transformer 100 may include additional protection to the robotic equipment by filtering both the AC and DC busses within the smart transformer 100. In particular, adding a filter to the DC bus may provide consistent power to an internal controller within the smart transformer 100, which protects the DC bus filter from being significantly affected by internal electromagnetic interference (EMI) generated by large contactors, AC wiring, and transformer coils. Additionally, the smart transformer 100 may include International Electrotechnical Commission (IEC)-style AC power input and output connectors. These features may further prevent an operator from coming into contact with any high voltage lines when using the smart transformer 100.

In some embodiments, the smart transformer 100 may include sound damping capabilities. For example, the smart transformer 100 may include acoustic foam for covering the side of baffles of the smart transformer 100. Further, the smart transformer 100 may include cooling paths to maintain air flow so as to keep internal electronics and wiring within the smart transformer 100 within a range of acceptable temperatures.

With reference to FIG. 1, the smart transformer 100 may be capable of receiving a power input. The power input may include a voltage input and a phase input. The smart transformer 100 may be configured to determine whether the phase input is single-phase or three-phase. In some embodiments, the determination of whether the phase input is single-phase or three-phase may be automatic. In some embodiments, if the phase input is determined to be single-phase, the power input may be converted into three-phase. In some embodiments, the single-phase power input may be converted into a three-phase power input using a commercial single-phase-to-three-phase converter. The single-phase-to-three-phase converter may convert the single-phase power input at a particular voltage into a three-phase power input at the same voltage.

The smart transformer 100 may be further configured to determine whether the voltage input is between a first voltage and a second voltage. In some embodiments, the determination of whether the voltage input is between a first voltage and a second voltage may be automatic. The first voltage may be a 208 VAC, having a tolerance of +/−7%, while the second voltage may be a 240 VAC, having a tolerance of +/−7%.

In some embodiments, the smart transformer 100 may include a plurality of commercial sensors for detecting if the power input is in an acceptable power configuration. In some embodiments, the power input must be in one of the following power configurations, each having a +/−7% tolerance: single-phase 208 VAC, single-phase 240 VAC, three-phase 208 VAC, or three-phase 240 VAC. In other embodiments, any power input between 208 VAC and 240 VAC, within a tolerance of +/−7%, is acceptable.

In some embodiments, if the voltage input is determined to be between the first voltage and the second voltage, the smart transformer 100 may be further configured to determine whether a phase voltage, a phase unbalance, a phase loss, and a phase reversal are also within predetermined acceptable ranges.

Figure 4:
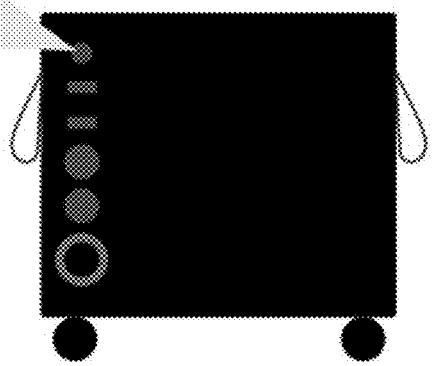
FIG. 4 depicts an example set of blink codes for a smart transformer system, in accordance with one or more example embodiments of the present disclosure.
Figure 4:
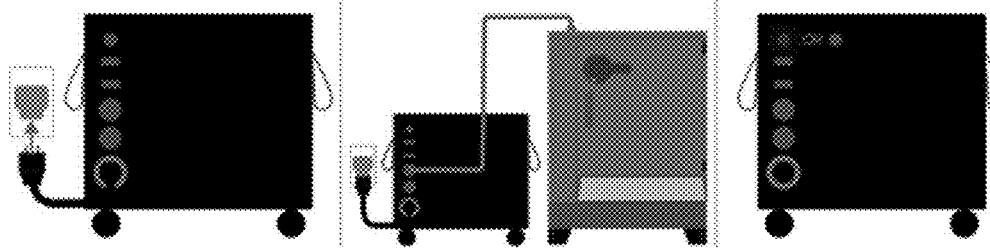

If the voltage input is determined to not be between the first voltage and the second voltage, a notification may be output to the operator of the smart transformer 100 via a multi-LED indicator, for example, as depicted in FIG. 4. If the voltage input is determined to be between the first voltage and the second voltage, the smart transformer 100 may be configured to route the power input through a plurality of transformer coils to produce a power output. In some embodiments, the plurality of transformer coils may be commercial transformer coils. In some embodiments, the power output may be a three-phase 480 VAC, having a tolerance of +/−10%. In other embodiments, the power output may be a three-phase power output at a different VAC level, such as a three-phase 240 VAC power output. In some embodiments, the smart transformer 100 may include at least two three-phase power output plugs.

It is understood that the above descriptions are for purposes of illustration and are not meant to be limiting.

Figure 2:
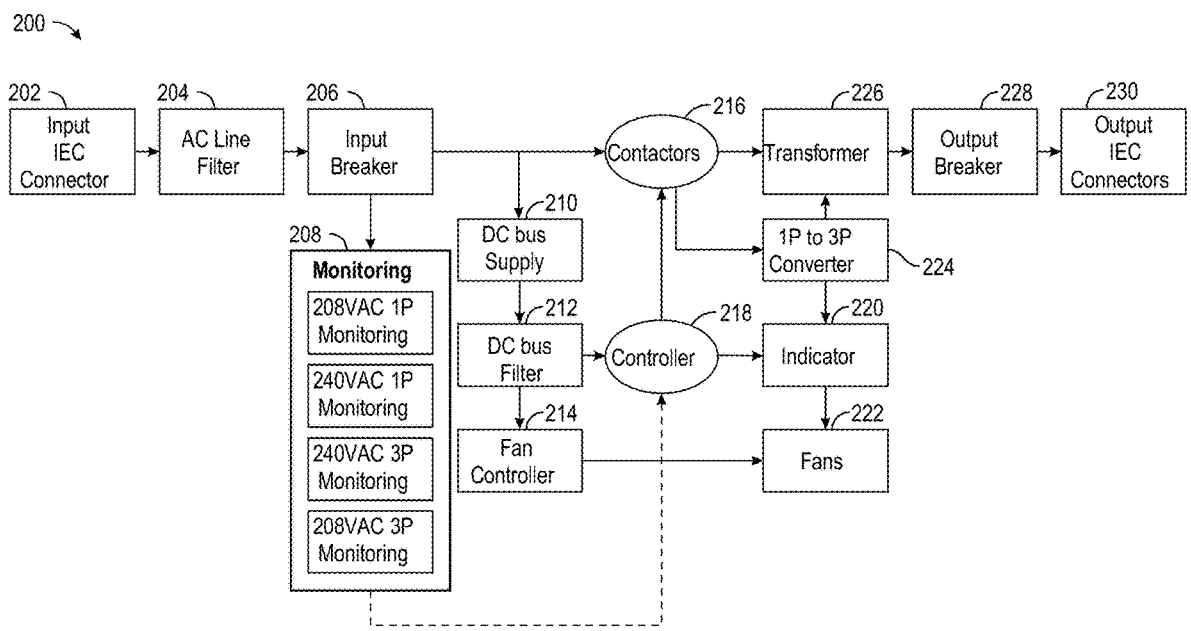
FIG. 2 depicts a block diagram of an example smart transformer machine and/or system upon which any of one or more techniques (e.g., methods) may be performed, in accordance with one or more example embodiments of the present disclosure.

FIG. 2 depicts a block diagram of an example smart transformer machine and/or system upon which any of one or more techniques (e.g., methods) may be performed, in accordance with one or more example embodiments of the present disclosure.

In some embodiments, a smart transformer 200 may operate as a stand-alone device or may be connected (e.g., networked) to other machines. In a networked deployment, the smart transformer 200 may operate in the capacity of a server machine, a client machine, or both in server-client network environments. In an example, the smart transformer 200 may act as a peer machine in peer-to-peer (P2P) (or other distributed) network environments. The smart transformer 200 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the smart transformer 200 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The smart transformer 200 may include at least one input IEC connector 202, which may be coupled to an AC line filter 204, which may be further coupled to an input breaker 206. The smart transformer 200 may include a monitoring unit 208 that is coupled to the input breaker 206, where the monitoring unit 208 may include single-phase 208 VAC monitoring, single-phase 240 VAC monitoring, three-phase 240 VAC monitoring, and three-phase 208 VAC monitoring. The smart transformer 200 may further include a DC bus supply 210 connected to the input breaker 206, a DC bus filter 212 coupled to the DC bus supply 210, and a fan controller 214 coupled to the DC bus filter 212. The smart transformer 200 may additionally include at least one contactor 216 coupled to the input breaker 206, at least one controller 218 coupled to the DC bus filter 212 and the monitoring unit 208. The smart transformer 200 may also include an indicator 220 coupled to the controller 218, and fans 222 coupled to the fan controller 214. In one example, the indicator 220 is a multi-color LED indicator. The smart transformer 200 may further include a single-phase-to-three-phase converter 224 coupled to the at least one contactor 216, a transformer 226 coupled to the at least one contactor 216 and the single-phase-to-three-phase converter 224, an output breaker 228 coupled to the transformer 226, and at least one output IEC connector 230 coupled to the output breaker 228. These components may couple and may communicate with each other through an interlink (e.g., bus). Further, the smart transformer 200 may include a power supply device that is capable of supplying power to the various components of the smart transformer 200.

The smart transformer 200 may carry out or perform any of the operations and processes (e.g., the process 600) described and shown below.

It is understood that the above are only a subset of what components the smart transformer 200 may include, and that other functions included throughout this disclosure may also be performed by the smart transformer 200.

Figure 3:
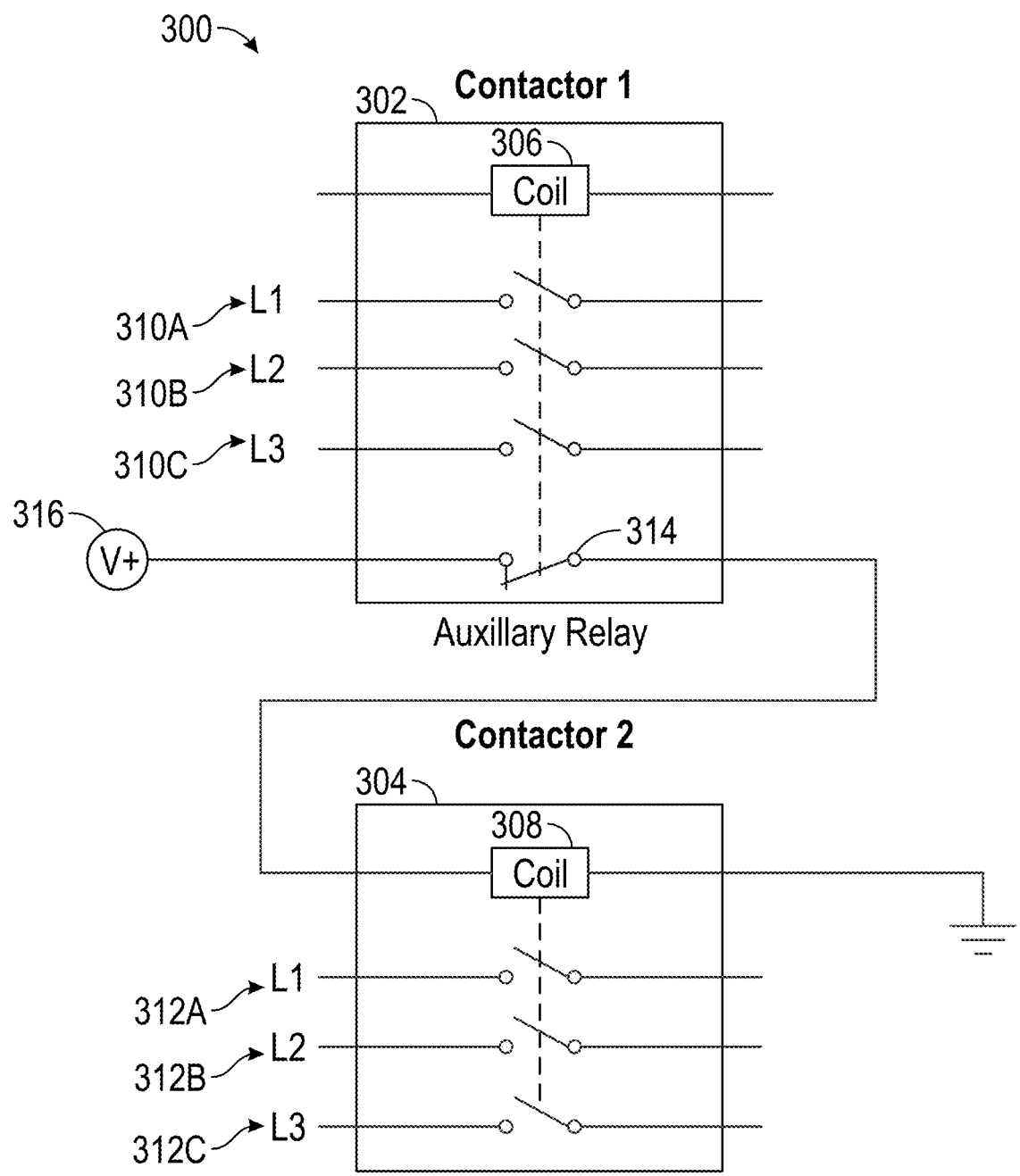
FIG. 3 depicts an illustrative schematic diagram of a plurality of contactors in a smart transformer system, in accordance with one or more example embodiments of the present disclosure.

FIG. 3 depicts an illustrative schematic diagram of a plurality of contactors in a smart transformer system, in accordance with one or more example embodiments of the present disclosure.

As depicted in FIG. 3, the smart transformer system 300 may contain at least one power contactor. For example, FIG. 3 depicts two power contactors 302 and 304. The power contactors 302 and 304 may be configured to operate regardless of the voltage input configuration. The power contactors 302 and 304 may be switched on and off by a system controller. When the system controller is switched on, an electrical coil in each power contactor is energized, such as the electrical coil 306 in Power Contactor 1 302 and the electrical coil 308 in Power Contactor 2 308. The energization of the electrical coils 306 and 308 thus creates a magnetic field in each of Power Contactor 1 302 and Power Contactor 2 304, which mechanically moves the connectors in each power contactor into position, so as to allow power to flow through Power Contactor 1 302 and Power Contactor 2 304. Each power connector may include three connectors 310A-C and 312A-C. The connectors 310A-C and 312A-C may be configured to open to prevent power from flowing through the power contactor, or to close to allow power to flow through the power contactor. In some embodiments, a plurality of auxiliary relays 314 may be mechanically coupled to Power Contactor 1 302 and Power Contactor 2 308 such that the plurality of auxiliary relays 314 move in unison with the connectors. When a voltage is applied to the electrical coil 306, an electromagnetic field is generated, and a metal linkage is magnetically attracted. The metal linkage may be mechanically connected to relays that are connected to connectors 310A-C and the plurality of auxiliary relays 314. As the metal linkage is moved by the electrical coil 306, the relays connected to connectors 310A-C and the plurality of auxiliary relays 314 are toggled, thus allowing current to flow through to various components of the smart transformer system 300. Because all the relays that are connected to the metal linkage and the connectors 310A-C are mechanically linked, the relays are all toggled at the same time by the electromagnetic field. In an instance in which one relay becomes stuck or welded shut, the remaining relays that are mechanically linked may also be configured to remain in a similar configuration.

In some embodiments, the wiring in the smart transformer system 300 may be routed to electrically limit the configurations of the power contactors that can be energized. For example, as depicted in FIG. 3, the power that is required to energize Power Connector 1 302 may be routed from a voltage source 316 through the auxiliary relay 314, which is attached to the electrical coil 308 of Power Contactor 2 304. The auxiliary relay 314 may be normally closed. Such a wiring configuration prevents the energization of Power Contactor 1 302 and Power Contactor 2 308 in a configuration that may short-circuit the smart transformer system 300, thus damaging various internal components or outputting an undesired power output. Such a wiring configuration further prevents unsafe configurations of the power contactors. This may occur when a power contactor is damaged, such that the power contactor does not disengage after it is de-energized. An example of this is when the power contactors are welded in the closed position and the power contactors then experience a large current when they are initially closed.

Further, as depicted in FIG. 3, the voltage input to Power Contactor 2 304 is routed from the voltage source 316 through the auxiliary relay 314 of Power Contactor 1 302. Thus, the connectors of Power Contactor 1 302 are forced to remain open in order for the connectors of Power Contactor 2 304 to be engaged. If the connectors of Power Contactor 1 302 were engaged, then the connectors of Power Contactor 2 304 would not be able to be engaged. This configuration further enhances the safety of the smart transformer system 300.

FIG. 4 depicts an example set of blink codes for a smart transformer system, in accordance with one or more example embodiments of the present disclosure.

As depicted in FIG. 4, the smart transformer system, such as the smart transformer 100 depicted in FIG. 1, may be configured to utilize a set of blink codes to communicate with an operator of the smart transformer system. For example, if the power input is not within range for one of the approved power configurations, the smart transformer system may be configured to notify an operator that the power input is not acceptable and explain why the power input is not acceptable. In some embodiments, this functionality can be accomplished through any means that allows an operator to visibly or audibly receive the notification. For example, this functionality may be accomplished through LEDs, LCDs, or any other visual or audio means. In some embodiments, this functionality may be accomplished through a multi-color LED indicator that emits blink codes. This functionality not only prevents damage to robotic equipment, but also allows the operator to figure out the error associated with the smart transformer system without having to call an electrician, use a multi-meter, or manually test the electrical outlet and risk getting shocked.

In some embodiments, a possible set of blink codes 400 using a multi-LED indicator may be as follows. The multi-color LED indicator may indicate a solid or blinking yellow light when the smart transformer is powering on and undergoing power input checks and switching. The multi-color LED indicator may then switch to a solid green light when the smart transformer is operating as expected and the voltage input is within an acceptable range. The multi-color LED indicator may use a single-pulse red light to indicate an error associated with a three-phase 208 VAC voltage input, a double-pulse red light to indicate an error associated with a three-phase 240 VAC voltage input, a triple-pulse red light to indicate an error associated with a single-phase 240 VAC voltage input, and a quadruple-pulse red light to indicate an error associated with a single-phase 208 VAC voltage input. The multi-color LED indicator may use a continuous-pulse red light to indicate that a voltage input is out of range. Thus, if a user accidentally plugs the smart transformer into a 120 VAC power outlet, the multi-color LED indicator may indicate a continuous-pulse red light to advise an operator that the voltage input is out of range for the smart transformer.

Figure 5:
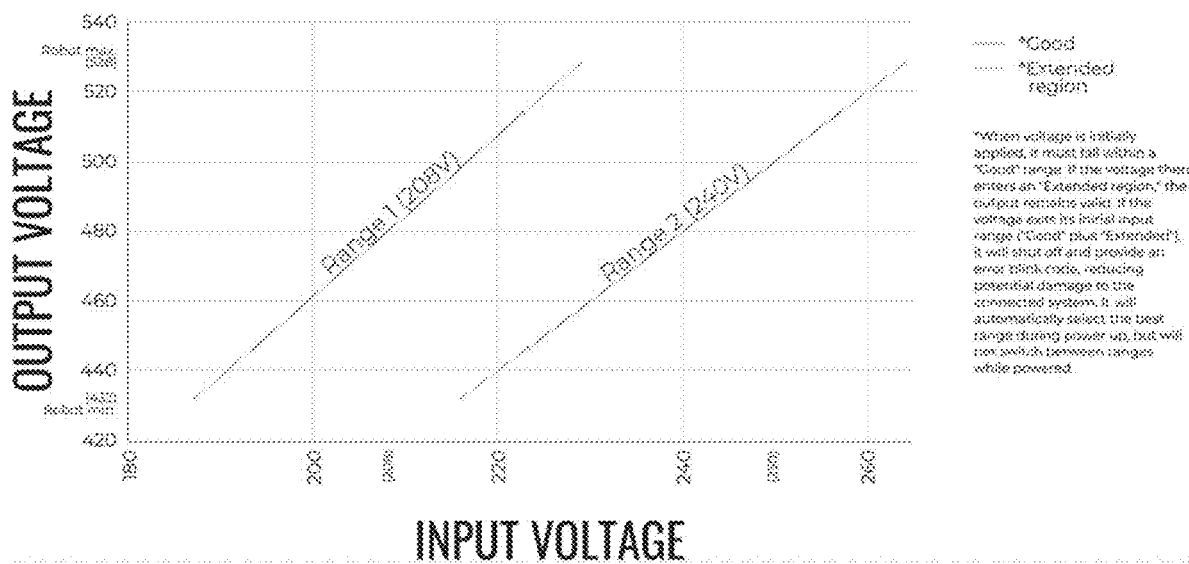
FIG. 5 depicts a graph reflecting output voltage against input voltage, in accordance with one or more example embodiments of the present disclosure.

FIG. 5 depicts a graph reflecting output voltage against input voltage, in accordance with one or more example embodiments of the present disclosure.

As depicted in FIG. 5, a graph 500 demonstrates the acceptable ranges of various input voltages. For example, when a power input is received, the voltage input of the power input may fall within a "Good Range," an "Extended Region," or the voltage input of the power input may fall outside of the "Good Range" or the "Extended Region." The voltage input must fall within a "Good Range" in order for a smart transformer, for example, the smart transformer 100 depicted in FIG. 1, to start to transform power and to perform optimally. If the voltage input falls within the "Extended Region," the voltage output of the power output may still remain valid, as long as the voltage input was initially within the "Good Range." However, if the voltage input does not fall within either the "Good Range" or the "Extended Region," the smart transformer may be configured to shut off and provide an error notification. For example, the smart transformer may output an error blank code, as demonstrated in FIG. 4, or the smart transformer may use alternative devices and/or methods to indicate the unacceptable voltage input. The smart transformer may be configured to automatically shut off to reduce potential damage to all connected systems.

As an example, as illustrated in FIG. 5, if the power input is configured to be 208 VAC, the "Good Range" of voltage inputs may range from approximately 193 VAC to 223 VAC to account for a +/−7% tolerance. The "Extended Region" of voltage inputs may include ranges from approximately 185 VAC to 193 VAC and from approximately 223 VAC to 230 VAC.

As another example, as illustrated in FIG. 5, if the power input is configured to be 240 VAC, the "Good Range" of voltage inputs may range from approximately 223 VAC to 257 VAC to account for a +/−7% tolerance. The "Extended Region" of voltage inputs may include ranges from approximately 216 VAC to 223 VAC and from approximately 257 VAC to 264 VAC.

In some embodiments, the smart transformer may be configured to automatically select a preferred voltage range associated with the "Good Range" when powering up. However, in some embodiments, the smart transformer may not be able to switch between preferred voltage ranges once the smart transformer has already been powered up.

In some embodiments, the smart transformer may additionally include circuit breakers that prevent the smart transformer from drawing too much current for internal circuitry or external loads.

In some embodiments, although the graph 500 depicts output voltages that are higher than input voltages (i.e., that the smart transformer is configured to convert a lower power input to a higher power output), the smart transformer may be further capable of converting a higher power input to a lower power input (i.e., that the output voltages are lower than the input voltages).

Figure 6:
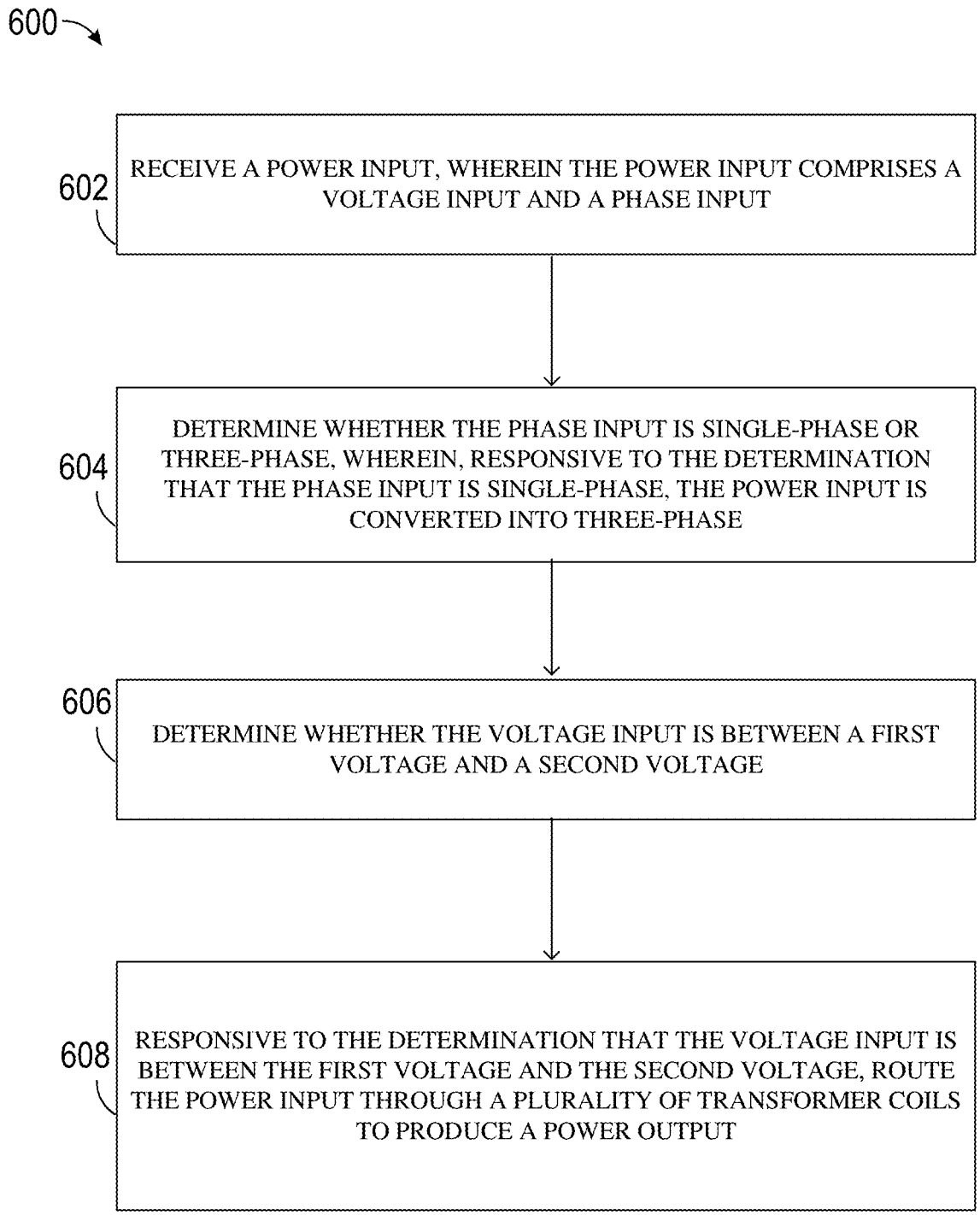
FIG. 6 depicts a flow diagram of an illustrative process for a smart transformer system, in accordance with one or more example embodiments of the present disclosure.

FIG. 6 illustrates a flow diagram of illustrative process 600 for a smart transformer system, in accordance with one or more example embodiments of the present disclosure.

At block 602, a smart transformer (e.g., the smart transformer 100 depicted in FIG. 1) may receive a power input. The power input may comprise a voltage input and a phase input.

At block 604, the smart transformer may determine whether the phase input is single-phase or three-phase. Responsive to a determination that the phase input is single-phase, the power input may be converted into three-phase. In some embodiments, the smart transformer may automatically determine whether the phase input is single-phase or three-phase.

At block 606, the smart transformer may determine whether the voltage input is between a first voltage and a second voltage. In some embodiments, the smart transformer may automatically determine that the voltage input is between the first voltage and the second voltage. In some embodiments, responsive to an automatic determination that the voltage input is not between the first voltage and the second voltage, the smart transformer may output a notification via a multi-colored LED indicator. In some embodiments, the first voltage may comprise a 208 VAC having a tolerance of +/−7%, and the second voltage may comprise a 240 VAC having a tolerance of +/−7%.

At block 608, the smart transformer may route the power input through a plurality of transformer coils to produce a power output, responsive to a determination that the voltage input is between the first voltage and the second voltage. In some embodiments, the power output may comprise a three-phase 480 VAC having a tolerance of +/−10%.

In some embodiments, the smart transformer may determine whether a phase voltage, a phase unbalance, a phase loss, and a phase reversal are within a predetermined range.

In some embodiments, the smart transformer may further comprise a first contactor and a second contactor. The second contactor may be configured to remain open when the first contactor is closed.

It is understood that the above descriptions are for purposes of illustration and are not meant to be limiting.

Various embodiments may be implemented fully or partially in software and/or firmware. This software and/or firmware may take the form of instructions contained in or on a non-transitory computer-readable storage medium or a machine-readable medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media, optical storage media, a flash memory, etc.

The term "machine-readable medium" may include any medium that is capable of storing, encoding, or carrying instructions for execution by the smart transformer, for example, the smart transformer 100 depicted in FIG. 1, and that cause the smart transformer, for example, the smart transformer 100 depicted in FIG. 1, to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM) and flash memory devices; magnetic disks, such as internal hard disks and removable disks; magneto-optical disks; and CD-ROM and DVD-ROM disks.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments of the smart transformer, for example, the smart transformer 100 depicted in FIG. 1, may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

The following examples pertain to further embodiments.

Example 1 may include a device comprising processing circuitry coupled to storage, the processing circuitry configured to: receive a power input, wherein the power input comprises a voltage input and a phase input; determine whether the phase input is single-phase or three-phase, wherein, responsive to the determination that the phase input is single-phase, the power input is converted into three-phase; determine whether the voltage input is between a first voltage and a second voltage; and responsive to the determination that the voltage input is between the first voltage and the second voltage, route the power input through a plurality of transformer coils to produce a power output.

Example 2 may include the device of example 1 and/or some other example herein, wherein the processing circuitry is further configured to: automatically determine whether the phase input is single-phase or three-phase; and automatically determine that the voltage input is between the first voltage and the second voltage.

Example 3 may include the device of example 2 and/or some other example herein, wherein the processing circuitry is further configured to: responsive to the automatic determination that the voltage input is not between the first voltage and the second voltage, output a notification via a multi-colored LED indicator.

Example 4 may include the device of example 1 and/or some other example herein, wherein the processing circuitry is further configured to: determine whether a phase voltage, a phase unbalance, a phase loss, and a phase reversal are within a predetermined range.

Example 5 may include the device of example 1 and/or some other example herein, wherein the device further comprises a first contactor and a second contactor.

Example 6 may include the device of example 5 and/or some other example herein, wherein the second contactor is configured to remain open when the first contactor is closed.

Example 7 may include the device of example 1 and/or some other example herein, wherein the first voltage comprises a 208 Volts Alternating Current (VAC) having a tolerance of +/−7%, and wherein the second voltage comprises a 240 VAC having a tolerance of +/−7%.

Example 8 may include the device of example 1 and/or some other example herein, wherein the power output comprises a three-phase 480 Volts Alternating Current (VAC) having a tolerance of +/−10%.

Example 9 may include a method comprising: receiving, at a device, a power input, wherein the power input comprises a voltage input and a phase input; determining, at the device, whether the phase input is single-phase or three-phase, wherein, responsive to the determination that the phase input is single-phase, the power input is converted into three-phase; determining, at the device, whether the voltage input is between a first voltage and a second voltage; and responsive to the determination that the voltage input is between the first voltage and the second voltage, routing the power input through a plurality of transformer coils of the device to produce a power output.

Example 10 may include the method of example 9 and/or some other example herein, further comprising: automatically determining, at the device, whether the phase input is single-phase or three-phase; and automatically determining, at the device, that the voltage input is between the first voltage and the second voltage.

Example 11 may include the method of example 10 and/or some other example herein, further comprising: responsive to the automatic determination that the voltage input is not between the first voltage and the second voltage, outputting, at the device, a notification via a multi-colored LED indicator.

Example 12 may include the method of example 9 and/or some other example herein, further comprising: determining, at the device, whether a phase voltage, a phase unbalance, a phase loss, and a phase reversal are within a predetermined range.

Example 13 may include the method of example 9 and/or some other example herein, wherein the device further comprises a first contactor and a second contactor.

Example 14 may include the method of example 13 and/or some other example herein, wherein the second contactor is configured to remain open when the first contactor is closed.

Example 15 may include a smart transformer system, the smart transformer system configured to: receive a power input, wherein the power input comprises a voltage input and a phase input; determine whether the phase input is single-phase or three-phase, wherein, responsive to the determination that the phase input is single-phase, the power input is converted into three-phase; determine whether the voltage input is between a first voltage and a second voltage; and responsive to the determination that the voltage input is between the first voltage and the second voltage, route the power input through a plurality of transformer coils to produce a power output.

Example 16 may include the smart transformer system of example 15 and/or some other example herein, wherein the smart transformer system is further configured to: automatically determine whether the phase input is single-phase or three-phase; and automatically determine that the voltage input is between the first voltage and the second voltage.

Example 17 may include the smart transformer system of example 16 and/or some other example herein, wherein the smart transformer system is further configured to: responsive to the automatic determination that the voltage input is not between the first voltage and the second voltage, output a notification via a multi-colored LED indicator.

Example 18 may include the smart transformer system of example 15 and/or some other example herein, wherein the smart transformer system is further configured to: determine whether a phase voltage, a phase unbalance, a phase loss, and a phase reversal are within a predetermined range.

Example 19 may include the smart transformer system of example 15 and/or some other example herein, wherein the device further comprises a first contactor and a second contactor.

Example 20 may include the method of example 19 and/or some other example herein, wherein the second contactor is configured to remain open when the first contactor is closed.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of utilizing a smart transformer device as shown and described herein.

Example 26 may include a system for providing a smart transformer device as shown and described herein.

Example 27 may include a device for providing a smart transformer device as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

Certain aspects of the disclosure are described above with reference to block and flow diagrams of systems, methods, devices, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   receive a power input, wherein the power input comprises a voltage input and a phase input;
   determine whether the phase input is single-phase or three-phase, wherein, responsive to the determination that the phase input is single-phase, the power input is converted into three-phase;
   determine whether the voltage input is between a first voltage and a second voltage; and
   responsive to the determination that the voltage input is between the first voltage and the second voltage, route the power input through a plurality of transformer coils to produce a power output.

2. The device of claim 1, wherein the processing circuitry is further configured to:
   automatically determine whether the phase input is single-phase or three-phase; and
   automatically determine that the voltage input is between the first voltage and the second voltage.

3. The device of claim 2, wherein the processing circuitry is further configured to:
   responsive to the automatic determination that the voltage input is not between the first voltage and the second voltage, output a notification via a multi-colored LED indicator.

4. The device of claim 1, wherein the processing circuitry is further configured to:
   determine whether a phase voltage, a phase unbalance, a phase loss, and a phase reversal are within a predetermined range.

5. The device of claim 1, wherein the device further comprises a first contactor and a second contactor.

6. The device of claim 5, wherein the second contactor is configured to remain open when the first contactor is closed.

7. The device of claim 1, wherein the first voltage comprises a 208 Volts Alternating Current (VAC) having a tolerance of +/−7%, and wherein the second voltage comprises a 240 VAC having a tolerance of +/−7%.

8. The device of claim 1, wherein the power output comprises a three-phase 480 Volts Alternating Current (VAC) having a tolerance of +/−10%.

9. A method comprising:
   receiving, at a device, a power input, wherein the power input comprises a voltage input and a phase input;
   determining, at the device, whether the phase input is single-phase or three-phase, wherein, responsive to the determination that the phase input is single-phase, the power input is converted into three-phase;
   determining, at the device, whether the voltage input is between a first voltage and a second voltage; and
   responsive to the determination that the voltage input is between the first voltage and the second voltage, routing the power input through a plurality of transformer coils of the device to produce a power output.

10. The method of claim 9, further comprising:
    automatically determining, at the device, whether the phase input is single-phase or three-phase; and
    automatically determining, at the device, that the voltage input is between the first voltage and the second voltage.

11. The method of claim 10, further comprising:
    responsive to the automatic determination that the voltage input is not between the first voltage and the second voltage, outputting, at the device, a notification via a multi-colored LED indicator.

12. The method of claim 9, further comprising:
    determining, at the device, whether a phase voltage, a phase unbalance, a phase loss, and a phase reversal are within a predetermined range.

13. The method of claim 9, wherein the device further comprises a first contactor and a second contactor.

14. The method of claim 13, wherein the second contactor is configured to remain open when the first contactor is closed.

15. A smart transformer system, the smart transformer system configured to:
    receive a power input, wherein the power input comprises a voltage input and a phase input;
    determine whether the phase input is single-phase or three-phase, wherein, responsive to the determination that the phase input is single-phase, the power input is converted into three-phase;
    determine whether the voltage input is between a first voltage and a second voltage; and
    responsive to the determination that the voltage input is between the first voltage and the second voltage, route the power input through a plurality of transformer coils to produce a power output.

16. The smart transformer system of claim 15, wherein the smart transformer system is further configured to:
    automatically determine whether the phase input is single-phase or three-phase; and
    automatically determine that the voltage input is between the first voltage and the second voltage.

17. The smart transformer system of claim 16, wherein the smart transformer system is further configured to:
    responsive to the automatic determination that the voltage input is not between the first voltage and the second voltage, output a notification via a multi-colored LED indicator.

18. The smart transformer of claim 15, wherein the smart transformer system is further configured to:

determine whether a phase voltage, a phase unbalance, a phase loss, and a phase reversal are within a predetermined range.

19. The smart transformer system of claim 15, wherein the smart transformer system comprises a first contactor and a second contactor.

20. The smart transformer system of claim 19, wherein the second contactor is configured to remain open when the first contactor is closed.

* * * * *